March 15, 1932.　　　A. W. CAPS　　　1,849,172
CAMERA
Filed April 4, 1929　　　3 Sheets-Sheet 1
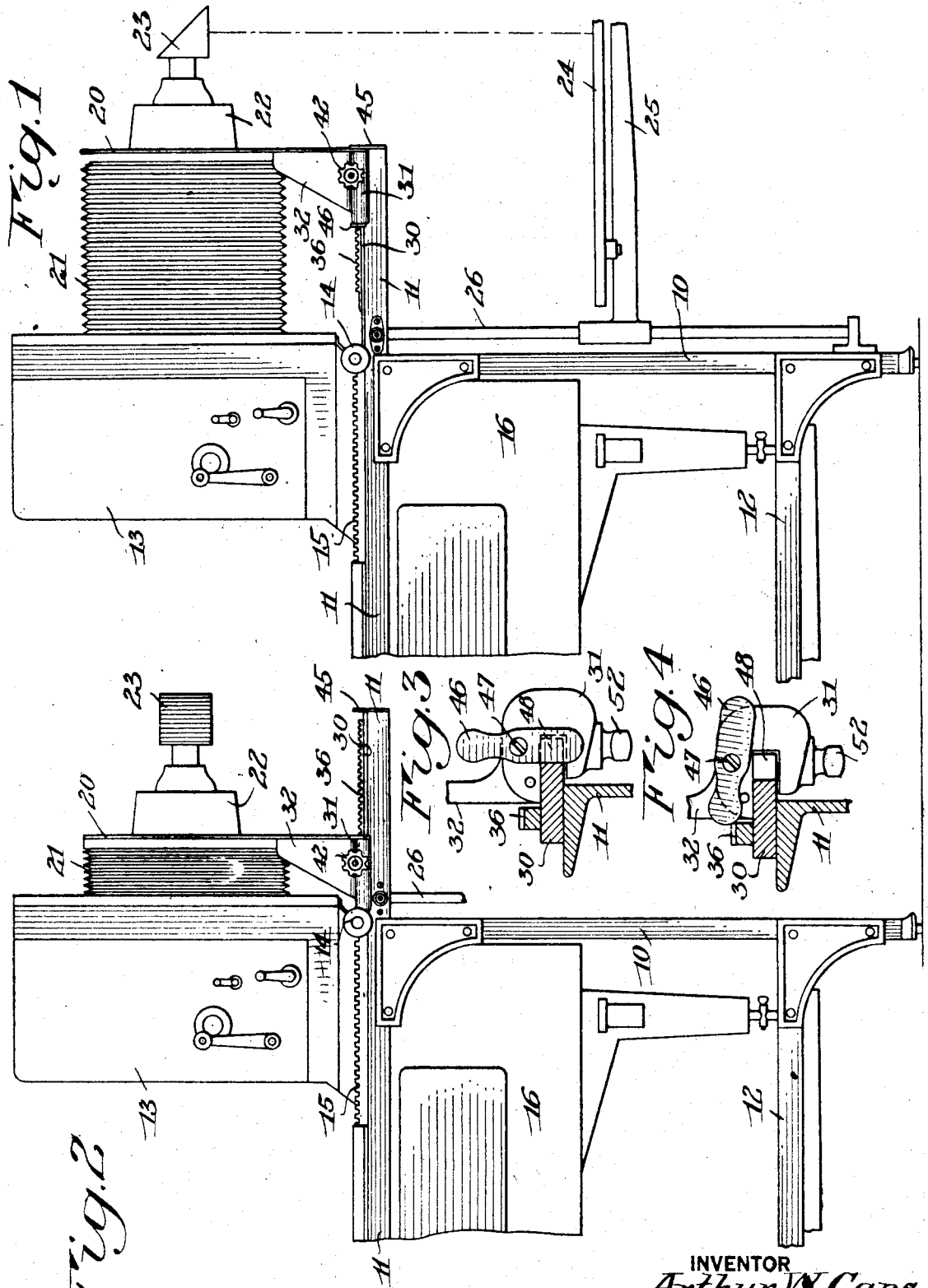
INVENTOR
Arthur W. Caps
BY
Dumpston & Griffith
his ATTORNEYS March 15, 1932. A. W. CAPS 1,849,172
CAMERA
Filed April 4, 1929 3 Sheets-Sheet 2
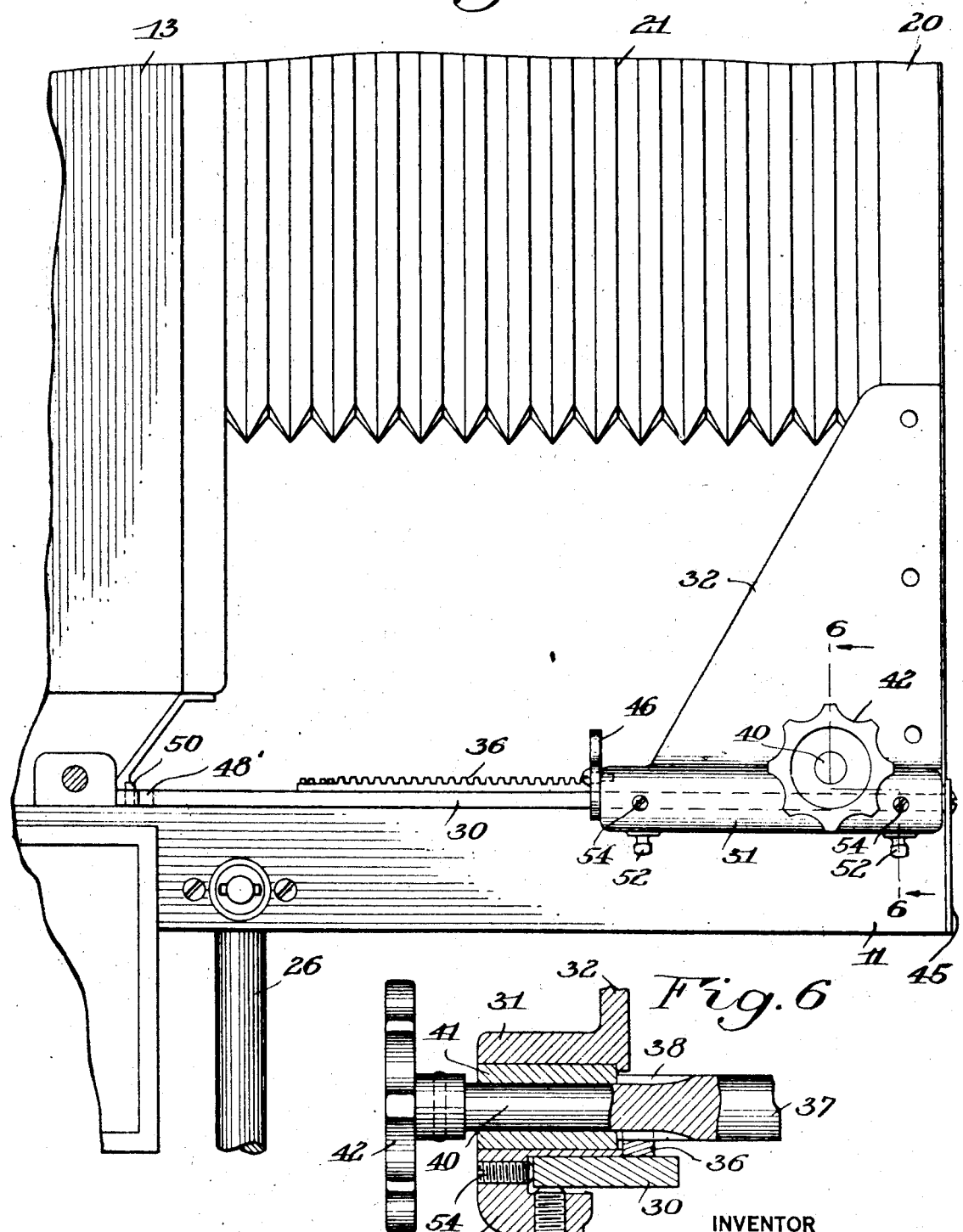

March 15, 1932.   A. W. CAPS   1,849,172
CAMERA
Filed April 4, 1929   3 Sheets-Sheet 3

INVENTOR
Arthur W. Caps
BY Cumpston & Griffith
his ATTORNEYS

Patented Mar. 15, 1932

1,849,172

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

CAMERA

Application filed April 4, 1929. Serial No. 352,349.

This invention relates to cameras of the type usually known as "commercial cameras," in which photographs of documents or other objects to be reproduced are made by exposing sensitized material to the action of light rays emanating from such objects, and the exposed material is then developed and fixed to make finished photographic prints. Usually, the chemical baths and other parts of the photographic print treating mechanism are placed within a casing connected to the camera body and movable as a unit therewith. It is to cameras of this kind that the present invention is especially applicable, though it may also be employed advantageously with other cameras.

In cameras of the kind above described, the camera body and the attached casing containing the print treating mechanism usually have a limited movement toward and from the camera front, so that the camera may be focused upon objects held by a copyholder which may be shifted to different positions. The extent of the focusing movement is so limited, however, that it is not possible to focus the camera upon objects held by an auxiliary copyholder placed at a distance from the lens substantially greater than the maximum distance of the main copyholder. An object of the present invention is to provide such a camera with means whereby it may be focused properly and easily upon such an auxiliary copyholder, so that great reductions in size may be obtained when desired.

Another object of the invention is the provision of a camera arranged to photograph objects at two ranges of distances, one range being, for example, the range obtainable by the normal movement of the usual copyholder, and the other range being that obtainable by the use of an auxiliary copyholder which may be placed substantially farther from the camera.

A further object is the provision of a camera in which an optical element such as a prism is normally centered relative to a copyholder for taking photographs of objects held by this copyholder, but in which the prism may be shifted quickly and easily to another position for taking photographs of objects held elsewhere than on this copyholder, and preferably in a different direction.

To these and other ends the invention resides in certain improvements and combinations of parts, all as will be hereinafter more fully described, the novel features being pointed out in the claims at the end of the specification.

In the drawings:

Fig. 1 is a fragmentary side elevation of a commercial camera illustrating a preferred embodiment of the invention applied thereto, showing the camera prism centered over the copyholder for taking photographs of objects held on the copyholder;

Fig. 2 is a view similar to Fig. 1, showing the parts of the camera shifted to focus it upon more distant objects, the prism being turned to receive light rays coming from a lateral direction;

Fig. 3 is a fragmentary view of the latch for the camera front, illustrating it in its effective position;

Fig. 4 is a view similar to Fig. 3 illustrating the latch in its ineffective position;

Fig. 5 is a fragmentary side elevation of a portion of the apparatus shown in Fig. 1 on a somewhat larger scale, to illustrate better the details of the invention;

Fig. 6 is a vertical section taken substantially on the line 6—6 of Fig. 5;

Similar reference numerals throughout the several views indicate the same parts.

Figure 7:
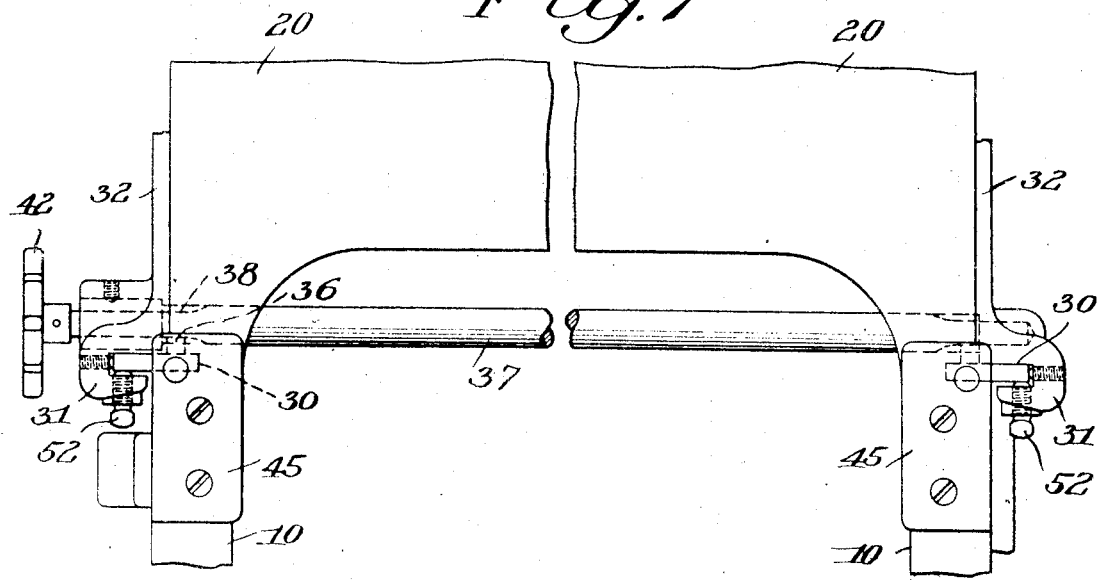
Fig. 7 is a fragmentary front elevation of parts of the camera.

There is illustrated in Fig. 1 a commercial camera having a frame comprising vertical posts 10, horizontal rails 11 at the tops thereof, and horizontal members 12 near the bottoms of the posts. A camera body 13 is movably mounted on the top rails 11 and is arranged to be shifted back and forth for focusing purposes by means of a handle 14 on a shaft mounted on the camera body and provided with pinions engaging racks 15 secured to the rails 11. This camera body 13 is provided with suitable means for holding sensitized sheet material in position to be exposed, and with means for shifting the exposed prints into a casing 16 containing suitable mechanism for treating the prints, such as developing, washing, and fixing baths. The casing 16 is suspended from the rails 11 and is attached to the camera body 13, so that the body and the casing move together as a unit when the handle 14 is turned to focus the camera.

The rails 11 project some distance beyond the posts 10 as illustrated in Fig. 1, and carry a camera front 20 connected by bellows 21 to the body 13. The camera front carries suitable lens and shutter means within a casing 22, and has a light reflecting device such as the prism 23 arranged to bend light rays through substantially 90°. In the normal operation of the camera, the prism 23 is arranged as indicated in Fig. 1 it being centered over a copyholder 24 mounted on a bracket 25 movable vertically along rods 26.

Normally, the documents or other objects being photographed are placed upon the copyholder 24 and the prism 23 is centered over the copyholder, the camera front 20 being substantially at the extreme ends of the rails 11. The copyholder may be raised or lowered along the rods 26, in order to place the documents at different distances from the prism 23 so as to obtain different amounts of reduction or enlargement, and the camera body is moved longitudinally toward or from the camera front 20 in order to focus the camera properly for any given position of the copyholder.

It is understood by those skilled in the art of photography that the greater the distance between the camera lens and the objects being photographed, the greater will be the reduction in size of the photographic print as compared to the size of the original object. Also, the farther the object is from the lens, the nearer the sensitized material must be to the lens in order that the image may be properly focused on the sensitized material.

Herefore, the camera fronts 20 of commercial cameras of the type here disclosed have been immovably secured to the front ends of the rails 11. This has resulted in a limitation upon the amount of reduction in size which it is possible to obtain when using such cameras, this limitation being due partly to the limited range of movement of the copyholder 24, and more especially to the limited range of movement of the camera body 13, which prevents bringing the sensitized material and the lens close enough to each other to obtain the proper focus on the object, even if the object were placed sufficiently far away from the lens to obtain a great reduction in size. The limited forward movement of the camera body 13 is due to the fact that certain cross braces and frame members extend across the frame of the apparatus at or near the plane of the posts 10, and these are in the path of travel of the casing 16 of the print treating mechanism, thus limiting the forward movement of this casing and consequently of the camera body 13, to which the casing is attached. The resulting limitation upon the amount of reduction in size of the photographic print as compared to the size of the object is undesirable, because it is frequently wished to make great reductions in size, as for example when a large map or chart is to be reproduced upon a comparatively small photographic print.

The present invention overcomes this undesirable limitation and permits the making of greatly reduced photographic copies. According to the present invention, the camera front 20 is made movable rather than fixed on the rails 11, and the prism 23 is rotatably mounted on the camera front so that it may be turned about the optical axis of the lens systems as a center. This permits the prism to be rotated from the position illustrated in Fig. 1, in which it receives light from the copyholder 24, to a second position as shown in Fig. 2, in which it is turned 90° from the first position and receives light from a lateral direction. The map, chart, or other large object to be photographed may then be hung on a wall or placed upon an easel or any other suitable support arranged laterally with respect to the prism 23, which support may be designated as an auxiliary copyholder. This permits the object to be placed much farther from the camera lens than could be done if it were positioned on the main copyholder 24, and thus fulfills one of the two conditions necessary for obtaining great reductions, the other condition of bringing the sensitized material and the lens closer to each other being fulfilled by moving the camera front 20 rearwardly.

To provide a guideway for the movable front 20, the horizontal frame members 11 have longitudinally extending plates 30 (Figs. 7 and 8) secured to them, these plates lying on top of the members 11 and extending laterally slightly beyond the outer edges of the members 11 so as to form overhanging ledges. The outer or overhanging ledges of these plates or guideways 30 are embraced by U-shaped members or brackets 31 which may slide longitudinally along the guides 30, and which are provided with upwardly extending flanges 32 which are secured to the camera front 20, so that the camera front is carried by the brackets 31 and may slide back and forth along the guides 30.

Figure 8:
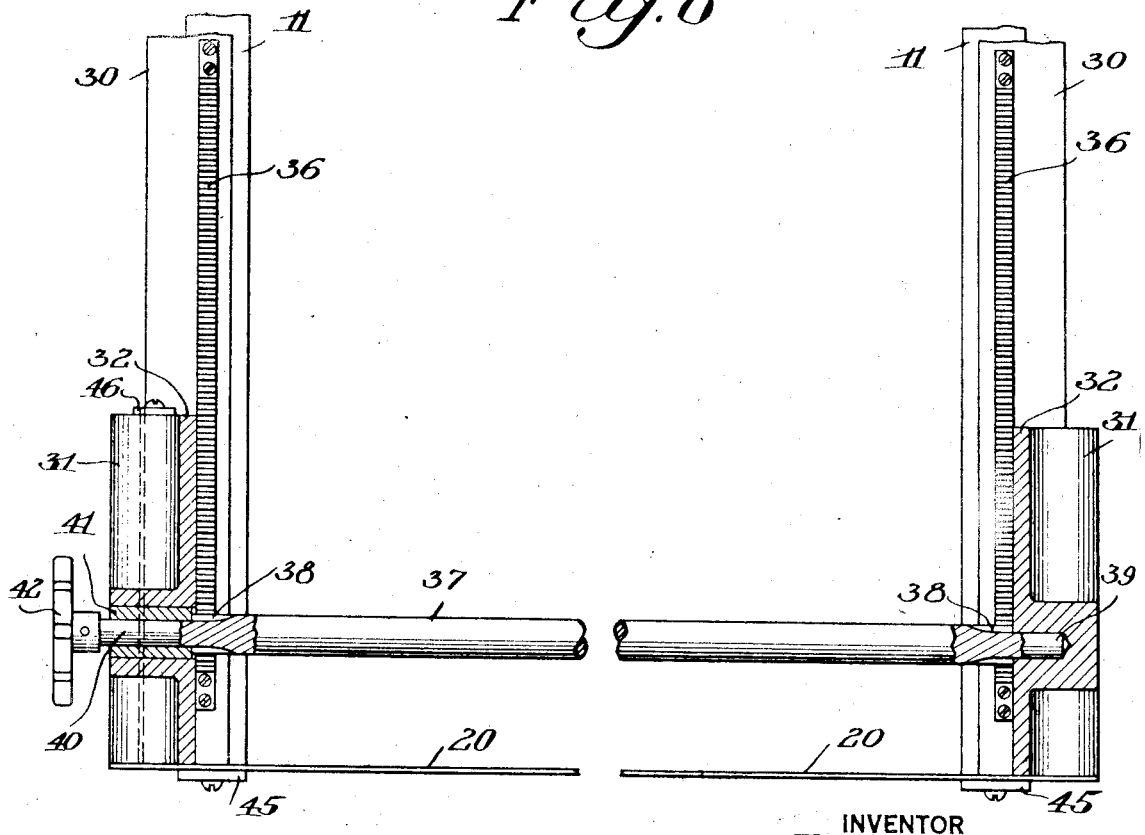
Fig. 8 is a plan of parts of the camera, with parts in section.

Racks 36 are secured to the guide plates 30, as shown especially in Figs. 5 and 8. A shaft 37 is journalled in the bracket members 31 and has pinion teeth 38 formed integrally thereon and arranged to mesh with the rack 36, so that rotation of the shaft will cause movement of the camera front along the guideways. One end of this shaft 37 is reduced as at 39 and journalled in one of the brackets 31, while the other end of the shaft is reduced as at 40 and journalled in a bushing 41 inserted in the other bracket 31. The outer diameter of the bushing 41 is slightly greater than the diameter of the shaft 37. This arrangement permits the shaft to be removed easily when necessary by removing the bushing, the shaft then passing through the opening in which the bushing is normally seated. A hand wheel 42 at the outer end of the reduced portion 40 forms a means for turning the shaft 37 to shift the camera front 20 back and forth.

A stop member 45 fixed to the forward ends of the guides 30 limits the forward movement of the camera front 20 and defines its normal position, in which the prism 23 is centered over the copyholder 24. Ordinarily, when the camera is being used to photograph objects held by this copyholder, the front 20 remains stationary in this forward position, and may be latched in this position by a pivoted latch member 46 (Figs. 3 and 5) which is secured to one of the bracket members 31 by a pivot screw 47 and is arranged to engage a notch 48 formed in the edge of the guide 30. When the camera front is in this position, for taking photographs of objects on the copyholder 24, the camera is focused by shifting the body 13 back and forth by rotation of the hand wheel 14.

When it is desired to make comparatively great reductions in size, the prism 23 is turned through 90° from the position shown in Fig. 1 to that shown in Fig. 2, the latch 46 is released from the forward notch 48 in which it was engaged, and the hand wheel 42 is turned to move the camera front 20 rearwardly toward the body 13, until the rear edge of one of the brackets 31 comes into contact with a stop pin 50 (Fig. 5) which prohibits further rearward movement. When the parts are in this position, the latch 46 is opposite a second notch 48' in the guide 30, and is engaged with this notch to hold the camera front against accidental movement. It will be seen that when the parts have been shifted to this position, the prism 23 is no longer centered over the copyholder 24, but is offcentered relative to the copyholder, and is arranged to receiver light coming from a second direction, namely from a lateral direction with respect to the camera rather than light coming upwardly from the copyholder 24. The camera front 20 has been moved rearwardly a substantial distance to bring the lens and the sensitized material closer together, thus permitting focusing of the camera upon objects placed on an auxiliary copyholder arranged laterally with respect to the camera, and comparatively distant from the lens.

Preferably the camera front 20 is always placed either in its extreme forward position, for cooperation with the horizontal copy holder 24, arranged vertically beneath the prism, or in its extreme rearward position, for cooperation with a substantially vertical auxiliary copyholder placed laterally and more distant from the prism. In either position of the camera front, focusing of the camera accurately is done by moving the camera body 13 and not by moving the camera front 20, which is latched in one or the other of its two positions. It may be said that the forward position of the camera front is for use in photographing objects at one range of distances, this being a range corresponding to the various positions in which the copyholder 24 might be placed. The rearward position of the copyholder may be said to be for use at a second range of distances, this being the range corresponding to the various positions in which the auxiliary lateral copyholder might be placed. Likewise the two positions of the camera front may be said to be for use in photographing objects in two different directions.

Sometimes a user of a camera such as is here disclosed will find that he uses the camera front almost exclusively in one of its two positions, seldom having occasion to shift it to the other position. In such cases, he may find it desirable to lock the camera front more securely in position than can be done simply by means of the pivoted latch 46, so as to prevent displacement of the camera front from the desired position. This may be accomplished by tightening four locking screws 52 threaded through the bracket members 31 as shown in Figs. 5, 6 and 7, and arranged to contact with the under sides of the guides 30. Two of these locking screws are arranged on each of the two brackets 31.

Since it is difficult to construct the camera front and the guides 30 so that they will accurately match each other in order that the camera front may slide easily upon the guides without any side play, it is preferable to make the bracket or slide members slightly too wide, and to provide adjusting means for narrowing the effective width of the slide members so that they will accurately fit the guides 30 without permitting side play. In other words, the distance from the outer edge of one guide 30 to the outer edge of the other guide at the opposite side of the camera, is made slightly less than the distance from the bottom of the guide-receiving notch in one of the bracket or slide members 31 to the bottom of the notch in the other slide member. Adjusting means such as the screws 54 (Figs. 5 and 6) are provided, these screws extending through the bracket members 31 and into the bottoms of the guide-receiving notches therein, so that the screws may be adjusted to vary the effective width of the slide members and thus to make them fit accurately upon the guides. The screws 54 are intended to be tightened just sufficiently so that they come in contact with the edges of the guides 30 and make a snug sliding fit therewith, without pressing against these guides so tightly as to interfere with the movement of the camera front from one of its positions to the other.

It will now be seen that there has been provided a camera which may be used normally in the way that commercial cameras of this kind are ordinarily used, to photograph objects placed upon a copyholder positioned beneath the prism, but which may be used satisfactorily, when occasion demands, to photograph objects on a greatly reduced scale, such objects being placed upon an auxiliary copyholder positioned laterally with respect to the prism. The camera may be changed over easily and quickly, which is an important consideration especially in situations where a high rate of output of prints is required from the camera. The invention may be applied to existing commercial cameras as well as to those hereafter constructed, by replacing the usual fixed camera front with a camera front constructed in accordance with the invention.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a photographic apparatus, the combination with a camera bed, of a camera body movably mounted on said bed for focusing, means for limiting the forward movement of said body relative to said bed, and a camera front movably mounted on said bed independently of said body, said camera front having one predetermined position adjacent the forward end of said bed, for taking photographs of objects in one direction relative to said camera and at one range of distances, and being shiftable therefrom to a second predetermined position rearwardly of said first position, for taking photographs of objects in a second direction relative to said camera and at another range of distances.

2. In a photographic apparatus, the combination with a camera bed having guideways thereon, of a camera body movably mounted relative to said bed, a camera front having guideways cooperating with the guideways on said bed, the guideways of said camera front being wider than the guideways of said bed, and an adjustable member cooperating with the guideways of said camera front to reduce the effective width of said guideways to prevent lateral play between said camera front and said bed.

3. In a photographic apparatus, the combination with a frame, of a camera body and a casing for photographic print treating apparatus in fixed relation to each other, said body and said casing being movable together as a unit relative to said frame through a limited range of movement for focusing the camera, a camera front mounted on and also movable relative to said frame independently of said body and casing so that it may be shifted from one definite predetermined position for taking photographs of objects at one range of distances, to another definite predetermined position for taking photographs of objects at a second range of distances, and latching means for latching said camera front in either one of said definite predetermined positions.

ARTHUR W. CAPS.